(12) United States Patent
Nolan et al.

(10) Patent No.: US 10,093,068 B2
(45) Date of Patent: Oct. 9, 2018

(54) METHOD AND SYSTEM FOR PROVIDING A RUBBER LINING

(71) Applicant: Polycorp Ltd., Elora (CA)

(72) Inventors: Dennis Joseph Nolan, Wellesley (CA); Jamie Richard Crane, Kitchener (CA); Tengli Luo, Guelph (CA); Jean Daniel Yiptong, Brampton (CA)

(73) Assignee: Polycorp Ltd., Elora, Ontario (CA)

( * ) Notice: Subject to any disclaimer, the term of this patent is extended or adjusted under 35 U.S.C. 154(b) by 1102 days.

(21) Appl. No.: 14/325,595

(22) Filed: Jul. 8, 2014

(65) Prior Publication Data

US 2016/0009036 A1 Jan. 14, 2016

(51) Int. Cl.
*B29C 73/10* (2006.01)
*B29C 73/12* (2006.01)
*B29L 30/00* (2006.01)

(52) U.S. Cl.
CPC .............. *B29C 73/10* (2013.01); *B29C 73/12* (2013.01); *B29L 2030/00* (2013.01)

(58) Field of Classification Search
CPC ...... B29C 73/10; B29C 73/12; B29L 2030/00
See application file for complete search history.

(56) References Cited

U.S. PATENT DOCUMENTS

| | | | |
|---|---|---|---|
| 4,352,707 A | 10/1982 | Wengler et al. | |
| 4,554,036 A | 11/1985 | Newsom | |
| 5,753,271 A | 5/1998 | Heimerdinger | |
| 6,468,372 B2 * | 10/2002 | Kociemba | B29C 43/3642 156/285 |
| 6,761,783 B2 | 7/2004 | Keller et al. | |
| 7,857,925 B2 | 12/2010 | Keller et al. | |
| 2003/0188821 A1 | 10/2003 | Keller et al. | |
| 2005/0022922 A1 | 2/2005 | Banasky | |
| 2008/0142137 A1 * | 6/2008 | Scheungraber | B29C 73/10 152/370 |
| 2010/0078118 A1 | 4/2010 | Ehsani | |
| 2011/0186205 A1 | 8/2011 | Kamiyama et al. | |
| 2011/0203719 A1 | 8/2011 | Kiest, Jr. | |
| 2011/0232829 A1 | 9/2011 | Cacace et al. | |
| 2012/0061006 A1 | 3/2012 | Marquardt | |
| 2012/0080135 A1 * | 4/2012 | Evens | B29C 73/10 156/94 |

* cited by examiner

*Primary Examiner* — Jacob T Minskey
*Assistant Examiner* — Melody Tsui

(57) ABSTRACT

A system including one or more rubber bodies with respective rubber portions. The rubber body is positionable on a preselected portion of a surface of an object. An inner side of the rubber body is engageable with the preselected portion, and an outer side thereof is opposed to the inner side. The system includes a release film positionable on the rubber body, a heating blanket positionable on the release film, and a breather fabric. The system also includes a vacuum cover engageable with the breather fabric, which is sealed along a perimeter surrounding the preselected portion of the surface. A vacuum pump is in fluid communication with an interior space partially defined by the vacuum cover, for subjecting the rubber body to a predetermined pressure. The rubber portion is vulcanizable when subjected to heat generated by the heating blanket and to the predetermined pressure.

13 Claims, 13 Drawing Sheets

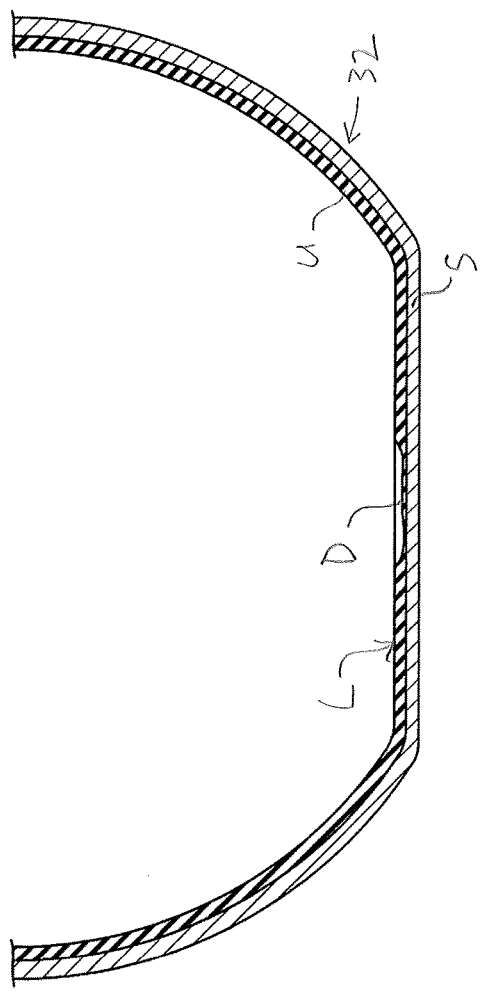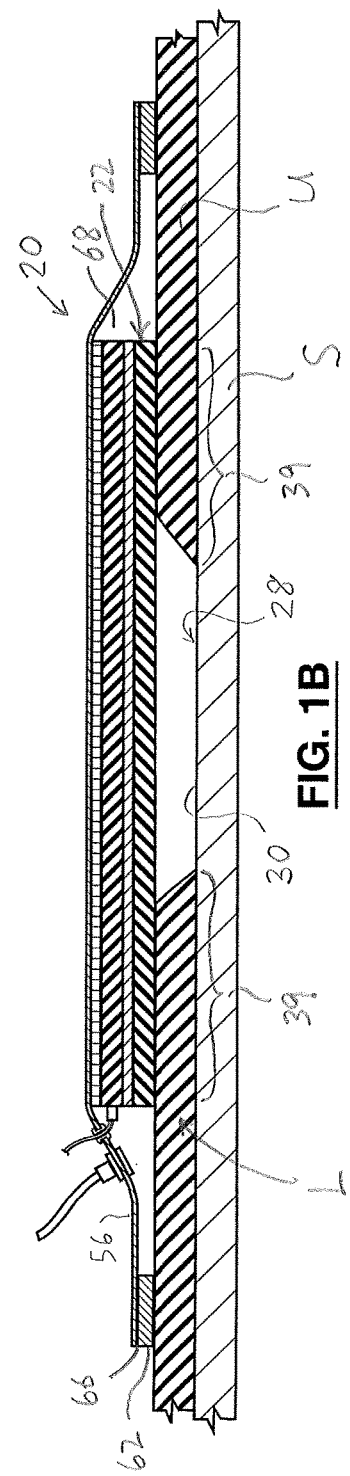
FIG. 1A
FIG. 1B

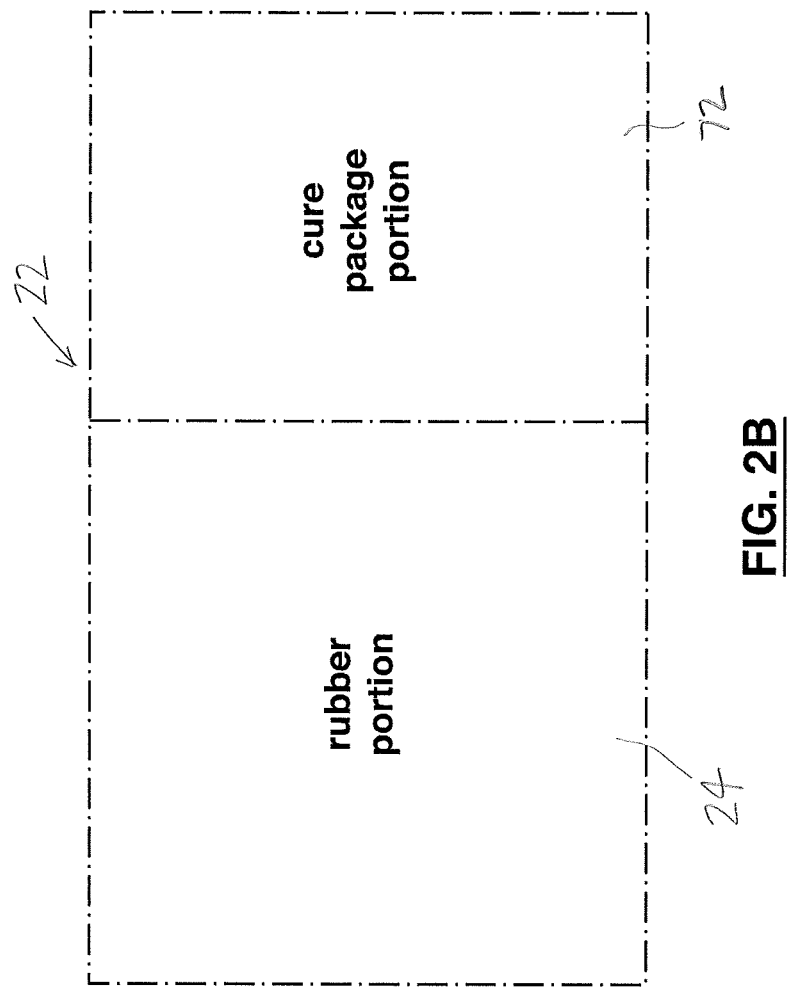

METHOD AND SYSTEM FOR PROVIDING A RUBBER LINING

FIELD OF THE INVENTION

The present invention is a method and a system for vulcanizing rubber to repair a damaged portion of a rubber lining or on a preselected portion of a surface of a workpiece.

BACKGROUND OF THE INVENTION

As is well known in the art, rubber linings are installed in tanks and other vessels to protect the vessel body (typically, steel) from corrosive or abrasive products carried in the vessel. The rubber lining is first secured to the tank wall using an adhesive system, and then vulcanized with steam, so that the rubber lining is bonded to the vessel body or wall. Conventionally, the wall is made of any suitable material, e.g., steel.

Although the useful life of a rubber lining is usually relatively long (e.g., three to 25 years), rubber linings are sometimes damaged in use, and must be repaired. For example, if a relatively small portion of the rubber lining is damaged, it must be replaced.

In the prior art, this may be done by, first, removing the damaged portion from the lining and positioning a patch of new rubber material in the hole resulting from removal of the damaged portion. The new rubber material can be secured to the vessel wall by an adhesive system, but it also has to be vulcanized, or cured. Currently the curing of the rubber lining repair patch can be achieved either chemically, or by steam.

Each of these methods has disadvantages. For instance, when the rubber patch is cured chemically, only the exposed surface of the patch is cured immediately, and the balance of the patch cures gradually over time. Curing the rubber patch with steam is difficult and time-consuming, as the entire vessel may be filled with the steam for a predetermined time period or it is necessary to isolate the rubber patch to ensure that the steam does not damage the surrounding lining.

There are other circumstances where vulcanization is difficult to achieve due to the nature of the part or area to be vulcanized or its position. For instance, certain elements of a tank or a railcar (e.g., flanges, or manways) are difficult to vulcanize with steam.

SUMMARY OF THE INVENTION

There is a need for a method and a system of repairing rubber linings that overcomes or mitigates one or more of the disadvantages or defects of the prior art. Such disadvantages or defects are not necessarily included in those listed above.

In its broad aspect, the invention provides a system including one or more rubber bodies each having a rubber portion. The rubber body is positionable on one or more preselected portions of a surface of an object. The rubber body includes an inner side engageable with the preselected portion, and an outer side opposed to the inner side. The system also includes a release film including opposed first and second sides thereof, the first side being positionable to engage the outer side of the rubber body, and a heating blanket for generating heat for vulcanizing the rubber portion, the heating blanket having a contact side and an opposed non-contact side. The heating blanket is positionable to engage the contact side with the second side of the release film. In addition, the system includes a breather fabric having an interior side and an opposed exterior side, the interior side being positionable on the non-contact side of the heating blanket, the breather fabric being formed to permit gases generated upon vulcanization of the rubber portion to be released therethrough. The system also includes a vacuum cover having an inward side and an opposed outward side, the inward side being engageable with the exterior side of the breather fabric. Also, the system includes one or more sealing elements for sealing the vacuum cover along a perimeter surrounding the preselected portion of the surface, to provide a substantially air-tight seal along the perimeter. The release film, the heating blanket, and the breather fabric are positioned in an interior space extending between the inward side of the vacuum cover and the outer side of the rubber body. The system also includes a vacuum pump in fluid communication with the interior space, for providing a partial vacuum therein to subject the rubber body to a predetermined pressure, and for removing the gases generated upon vulcanizing the rubber portion from the interior space. The rubber portion is vulcanizable when subjected to the heat generated by the heating blanket and when subjected to the predetermined pressure, to bond the rubber body and the preselected portion of the surface of the object.

In another of its aspects, the invention provides a method of repairing a damaged portion of a rubber lining secured to a substrate, the damaged portion being at least partially adjacent to an undamaged portion of the rubber lining. The method includes preparing the rubber lining for repair. A rubber body with a rubber portion thereof is provided, being configured to bond with a preselected portion of the substrate and a selected region of the undamaged portion of the rubber lining upon vulcanization of the rubber portion. The rubber body is positioned on at least the damaged portion of the rubber lining, and a release film is positioned on the rubber body. A heating blanket is positioned on the release film, the heating blanket being configured for generating heat to vulcanize the rubber portion, and a breather fabric is positioned on the heating blanket. A vacuum cover is positioned over the breather fabric, to at least partially define an interior space between the rubber body and the vacuum cover in which the release film, the heating blanket, and the breather fabric are located. A perimeter of the interior space is at least partially defined by sealing the vacuum cover along the perimeter around the damaged portion, to provide a substantially air-tight seal along the perimeter. With a vacuum pump, a partial vacuum is provided in the interior space, to subject the rubber body to a predetermined pressure. Also, and at substantially the same time, the rubber body is subjected to the heat generated by the heating blanket while the rubber body is subjected to the predetermined pressure, to vulcanize the rubber portion, thereby repairing the rubber lining.

In yet another aspect, the invention provides a system including one or more rubber bodies each having a rubber portion. The rubber body is positionable on a preselected portion of a surface of a workpiece, and includes an inner side engageable with the preselected portion, and an outer side opposed to the inner side. The system also includes a release film having a first side and an opposed second side, the first side being engageable with the outer side of the rubber body, and a heating blanket for generating heat to vulcanize the rubber portion, the heating blanket having a contact side and an opposed non-contact side, the contact side being engageable with the second side of the release film. In addition, the system includes a breather fabric having an interior side and an opposed exterior side, the interior side being engageable with the non-contact side of the heating blanket and configured to permit gases generated upon the vulcanization of the rubber portion to be released therethrough. The system also includes a vacuum cover having an inward side and an opposed outward side, the inward side being engageable with the exterior side of the breather fabric, and one or more sealing elements for sealing the vacuum cover along a perimeter surrounding the preselected portion to provide a substantially air-tight seal along the perimeter. The perimeter at least partially defines an interior space extending between the inward side of the vacuum cover and the outer side of the rubber body, and the release film, the heating blanket, and the breather fabric are located in the interior space. In addition, the system includes a vacuum pump in fluid communication with the interior space for providing at least a partial vacuum in the interior space, to subject the rubber body to approximately atmospheric pressure. The rubber body is vulcanizable by the heat generated by the heating blanket and upon being subjected to approximately atmospheric pressure.

In another of its aspects, the invention provides a method for vulcanizing a rubber portion of one or more rubber bodies to one or more preselected portions of a surface of a workpiece. The method includes positioning the rubber body on the preselected portion, positioning a release film on the rubber body, positioning a heating blanket on the release film, the heating blanket being configured to provide heat for vulcanizing the rubber portion, and positioning a breather fabric on the heating blanket. Also, a vacuum cover is positioned over the breather fabric, to at least partially define an interior space between the rubber body and the vacuum cover in which the release film, the heating blanket, and the breather fabric are located. A perimeter of the interior space is at least partially defined by securing the vacuum cover around the preselected portion, to provide a substantially air-tight seal. At least a partial vacuum is provided in the interior space, thereby subjecting the rubber body to approximately atmospheric pressure. At substantially the same time, the rubber body is subjected to the heat generated by the heating blanket, to vulcanize the rubber portion.

BRIEF DESCRIPTION OF THE DRAWINGS

The invention will be better understood with reference to the attached drawings, in which:

FIG. 1A is a cross-section of a tank with a rubber lining having a damaged portion;

FIG. 1B is a cross-section of an embodiment of a system of the invention positioned to repair the rubber lining of FIG. 1A, drawn at a larger scale;

FIG. 2B is a schematic illustration of an embodiment of a rubber body or an elastomer assembly of the invention;

DETAILED DESCRIPTION

Figure 2A:
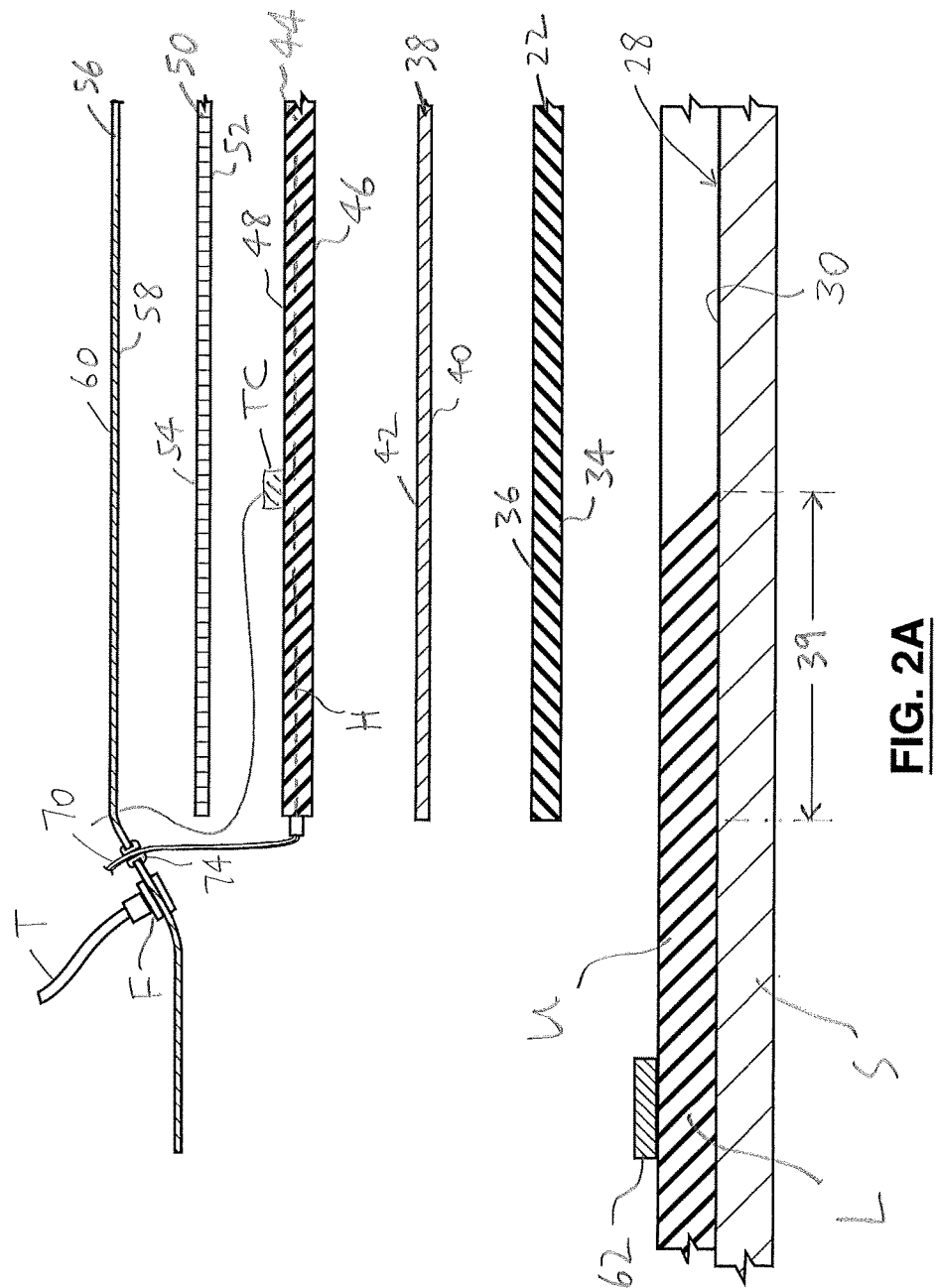
FIG. 2A is an exploded cross-section of part of the system of FIG. 1B.

In the attached drawings, like reference numerals designate corresponding elements throughout. Reference is first made to FIGS. 1A-2D to describe an embodiment of a system in accordance with the invention indicated generally by the numeral 20 (FIG. 1B). As will be described, the system 20 preferably includes one or more rubber bodies 22 (FIG. 2A), each including a rubber portion 24 (FIG. 2B). It is preferred that the rubber body 22 is positionable on one or more preselected portions 28 of a surface 30 of an object 32 (FIGS. 1A-2A). As shown in FIG. 2A, the rubber body 22 preferably includes an inner side 34 engageable with the preselected portion 28, and an outer side 36 opposed to the inner side 34. It is also preferred that the system 20 includes a release film 38 including opposed first and second sides 40, 42 thereof, the first side 40 being positionable to engage the outer side 36 of the rubber body 22 (FIG. 2A). In one embodiment, the system 20 preferably also includes a heating blanket 44 for generating heat to vulcanize the rubber portion 24. The heating blanket 44 has a contact side 46 and an opposed non-contact side 48 (FIG. 2A). As can be seen in FIG. 2A, the heating blanket 44 preferably is positionable to engage the contact side 46 with the second side 42 of the release film 38. It can also be seen in FIG. 2A that the system 20 preferably also includes a breather fabric 50 having an interior side 52 and an opposed exterior side 54. Preferably, the interior side 52 is positionable on the non-contact side 48 of the heating blanket 44. In one embodiment, the breather fabric 50 preferably is formed to permit gases generated upon vulcanization of the rubber portion 24 to be released therethrough, as will also be described. As can also be seen in FIG. 2A, the system 20 preferably also includes a vacuum cover 56 having an inward side 58 and an opposed outward side 60, the inward side 58 being engageable with the exterior side 54 of the breather fabric 50. In one embodiment, it is also preferred that the system 20 includes one or more sealing elements 62 for sealing the vacuum cover 56 along a perimeter 64 (FIG. 2C) surrounding the preselected portion 28 of the surface 30, to provide a substantially air-tight seal 66 along the perimeter 64. The release film 38, the heating blanket 44, and the breather fabric 50 preferably are positioned in an interior space 68 (FIG. 1B) extending between the inward side 58 of the vacuum cover 56 and the outer side 36 of the rubber body 22. Preferably, the system 20 also includes a vacuum pump 69 (FIG. 2C) in fluid communication with the interior space 68, for providing a partial vacuum therein to subject the rubber body 22 to a predetermined pressure, and for removing the gases generated upon vulcanizing the rubber portion 24 from the interior space 68. The rubber portion 24 preferably is vulcanizable when subjected to the heat generated by the heating blanket 44 and when subjected to the predetermined pressure, to bond the rubber body 22 and the preselected portion 28 of the surface 30 of the object 32.

Those skilled in the art would appreciate that the heating blanket 44 may have various configurations. In one embodiment, the system 20 preferably also includes means 70 for transmitting electrical energy to the heating blanket 44, to generate the heat therefrom. It is also preferred that the system 20 includes a controller 71 (FIG. 2C) for controlling the electrical energy provided to the heating blanket 44 in accordance with a preselected cure profile for the rubber body 22, as will be described.

As will also be described, the system 20 preferably includes one or more temperature sensors "TC" at least partially positioned on the heating blanket 44 (FIG. 2A), for providing temperature data to the controller 71. In addition, the controller 71 preferably is configured to control the electrical energy provided to the heating blanket 44 at least partially based on the temperature data. For instance, the controller 71 may be programmable, so that relevant parameters of the preselected cure profile can be input, and used in controlling the electrical energy provided to the heating blanket 44.

Preferably, the predetermined pressure is approximately atmospheric pressure.

As is known in the art, the process of vulcanization involves converting rubber into a material with preselected desirable characteristics by the addition of curatives and/or accelerators, and/or other additives. The curatives or accelerators or other additives are collectively referred to as the "cure package". In FIG. 2B, the rubber body 22 is schematically illustrated as including two portions, i.e., the rubber portion 24, and a cure package portion 72. However, it will be understood that FIG. 2B is simplified for clarity of illustration. Those skilled in the art would appreciate that the cure package portion 72 preferably is mixed with the rubber portion 24 throughout the rubber body 22.

In one embodiment, the system 20 of the invention preferably is used to repair a damaged portion "D" of a rubber lining "L" (FIG. 1A). Those skilled in the art would appreciate that the lining "L" is secured to a substrate "S" that may be included, e.g., in a tank or other vessel.

Figure 2C:
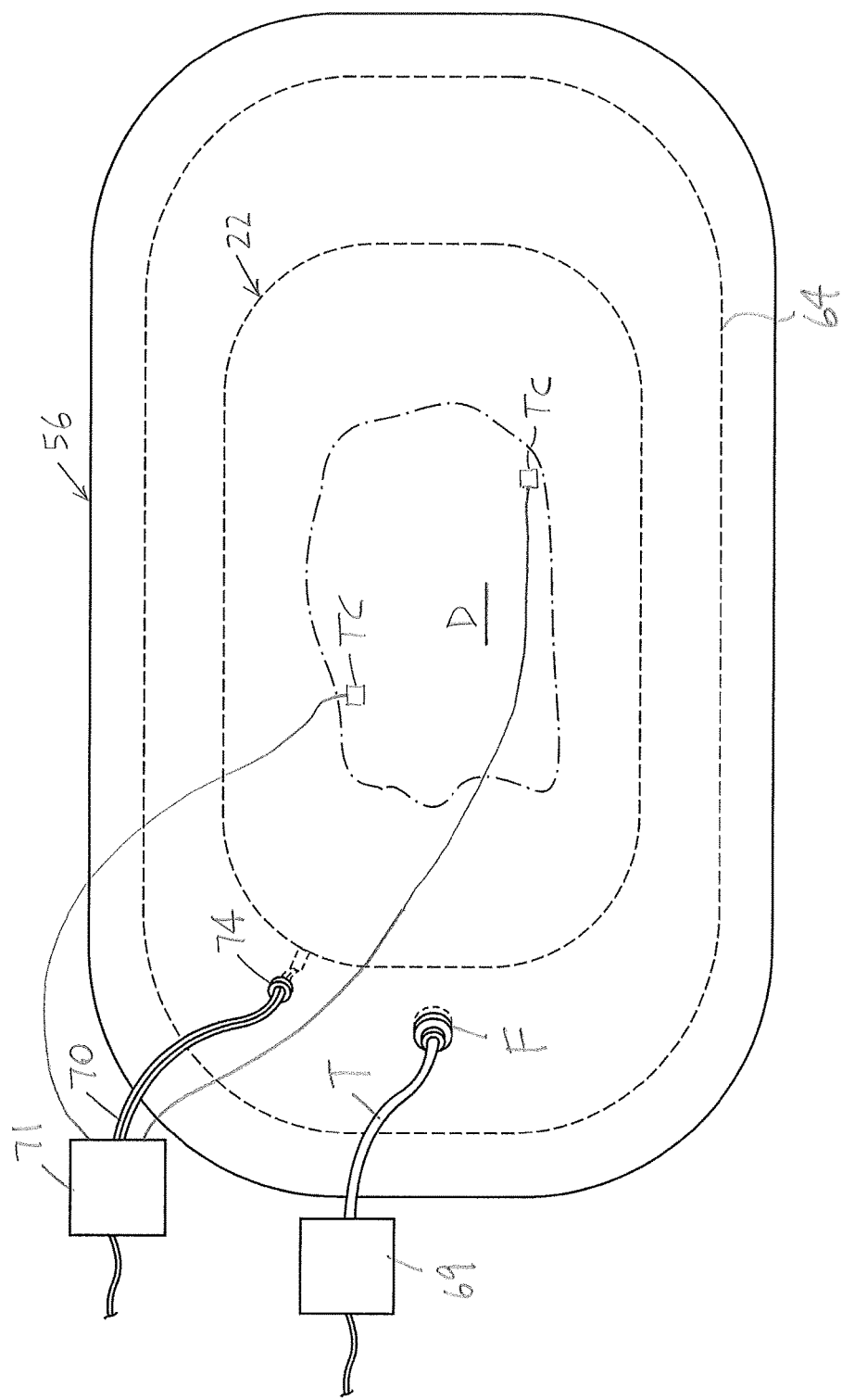
FIG. 2C is a top view of the system of FIG. 1B, drawn at a smaller scale.

As will be described, it is preferred that the damaged portion "D" is removed, to expose the surface 30 of the substrate "S" in the preselected portion 28, i.e., the area to be repaired. As can be seen in FIGS. 1B, 2A and 2C, the rubber body 22 preferably is positioned on the preselected portion 28, and the other elements of the system 20 preferably are positioned as required, to result in an arrangement of such elements in the sequence illustrated in FIGS. 1B and 2A. It will be understood that a number of elements have been omitted from FIG. 2C for clarity of illustration. It will also be understood that, in FIGS. 1B and 2A, the thicknesses of different elements of the system are exaggerated or minimized relative to the thicknesses of other such elements, for clarity of illustration.

As can be seen in FIGS. 1B and 2A, prior to vulcanization, the rubber body 22 preferably is sufficiently large to overlap a selected region 39 of an undamaged portion "U" of the pre-existing rubber lining "L", in addition to the rubber body 22 covering the preselected portion 28 of the substrate. As will be described, it is preferred that the selected region 39 of the undamaged portion "U" of the rubber lining "L" is treated in order that the rubber portion 24 will bond to the selected region 39 (i.e., as well as to the preselected portion 28 of the substrate "S") upon vulcanization.

The vulcanization of elastomers (e.g., rubber) using the heating blanket 44, the vacuum cover 56, and the other components of the system 20 noted above to repair the rubber lining "L" presents particular challenges, due to the different polymers and curing systems that may be involved. In order to meet the physical and mechanical property requirements for an adequate repair of the rubber lining "L", each rubber body or elastomer assembly 22 is required to be specifically formulated, so that the rubber portion 24 (i.e., the elastomer) is vulcanized at a temperature and cure profile that is specific to the elastomer (i.e., the rubber portion). Some of the challenges are as follows.

1. Elastomers may be homogenous or blend systems, such as natural rubbers (NR), polyisoprene (IR), polybutadiene rubber (BR), styrene-butadiene rubbers (SBR), polyisobutylene-isoprene (IIR, CIIR and BIIR), polychloroprene (CR), chlorosulfonated polyethylene (Hypalon), ethylene-propylene-diene rubbers (EPDM), nitrile rubbers (NBR and HNBR).

2. Curing systems (i.e., cure packages) may be sulfur, metallic oxides, phenolic resins or peroxides based.

3. Curing temperatures may be adjusted depending on each individual elastomer from 150 to 300° F. (65.6 to 148.9° C.).

4. Curing times may range from 1 hour to 10 hours.

5. The rubber part to be repaired (e.g., the damaged portion "D" of the rubber lining "L") can be a simple flat sheet or a relatively complex three-dimensional contoured part.

Those skilled in the art would appreciate that the composition of the rubber lining "L" may vary accordingly. Preferably, the rubber body or elastomer assembly 22 is compatible with the rubber lining "L". Exemplary compound ingredients for the rubber lining "L" are listed in Table I. Solely as an example, a list of the components of one embodiment of the rubber body or elastomer assembly 22 (i.e., the rubber portion 24 and the cure package portion 72) are listed in Table II.

TABLE I

| | Ingredient | phr* |
|---|---|---|
| 1 | Raw elastomer | 100 |
| 2 | Zinc Oxide | 3-5 |
| 3 | Stearic Acid | 1-2 |
| 4 | Fillers | 5-70 |
| 5 | Plasticizers | 3-20 |
| 6 | Antioxidants | 1-4 |
| 7 | Primary Accelerator | 0.5-2.0 |
| 8 | Secondary Accelerator | 0.5-2.0 |
| 9 | Vulcanizing agent | 0.5-40 |

*parts per hundred rubber (pre-vulcanization)

TABLE II

| | Ingredient | phr* |
|---|---|---|
| 1 | NR | 100 |
| 2 | ZnO | 5 |
| 3 | Stearic Acid | 1 |
| 4 | N774 | 35 |
| 5 | Cumar P 25 | 5 |
| 6 | TMQ | 1 |

TABLE II-continued

| | Ingredient | phr* |
|---|---|---|
| 7 | CBS | 1.06 |
| 8 | TMTD | 0.54 |
| 9 | Sulfur | 2.5 |

*parts per hundred rubber (pre-vulcanization)

The rubber body or elastomer assembly used as an example in Table II above is 55 Durometer (A) black soft natural rubber, with a sulfur cure system. Those skilled in the art would appreciate that various other rubber formulations and cure packages may be used, depending on a number of factors, e.g., the composition of the rubber lining "L".

Rheological Properties

The vulcanization characteristics of rubber compound can be determined by using rotorless cure meter (MDR), in accordance with ASTM D5289. Exemplary test data for the 55 Duro (A) black soft natural rubber are listed in Table III below. The Tc90 indicates the cure time for this compound at a temperature of 350° F. with thickness of 0.080 inch.

TABLE III

| Test condition | 3 min./ 350° F. |
|---|---|
| MH, (lbf.in) | 11.55 |
| ML, (lbf.in) | 1.80 |
| Ts2, (min) | 1.19 |
| Tc90, (min) | 1.79 |

Those skilled in the art would appreciate that rubber bodies with other formulations would have other test results.

Figure 2D:
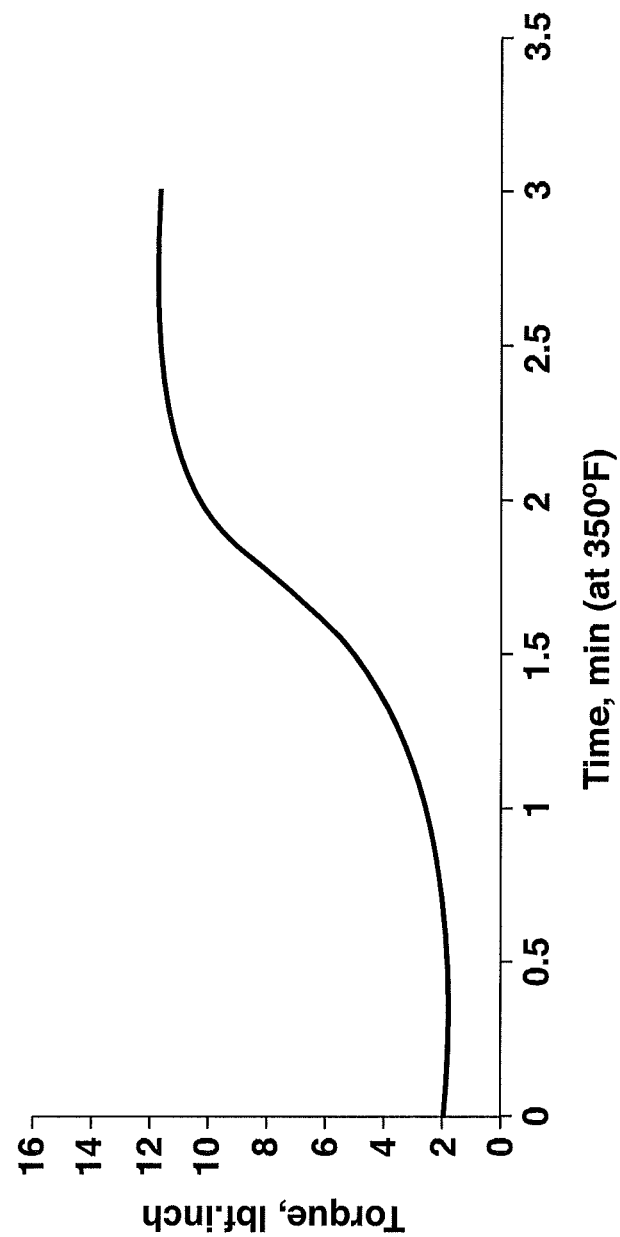
FIG. 2D is a representation of an exemplary cure profile of a particular rubber portion.

As an example, a cure profile (i.e., a vulcanization curve) of 55 Duro (A) black natural rubber is provided in FIG. 2D. It will be understood that, for a particular rubber body 22, the controller 71 is programmed in accordance with the cure profile for that particular rubber body 22 to permit transmission of electrical energy to the heating blanket 44 so as to cure the rubber portion 24, to give the rubber portion 24 the desired characteristics for a particular application.

Vulcanization Process Using Electric Heating Blanket

In the vulcanization processes, a number of factors, e.g. differences in the thickness of the rubber lining, the thickness of the rubber body, the cure temperature, time, pressure, and the thermal stability of the rubber compound, are to be considered. It will be understood that the electric heating blanket curing method of the invention herein provides a maximum of approximately 14.7 psi pressure (i.e., approximately atmospheric pressure) to the rubber body 22 during vulcanization. Therefore, each of the cure temperature, cure time, and thickness of the rubber body 22 is an important factor in the state of cure of the rubber body.

Relationship of Physical Properties and Cure Time and Temperature

In order to meet the physical and mechanical property requirements of a rubber lining (i.e., after repair), it is important that the appropriate cure time and temperature for the specific thickness of the rubber body used to patch the lining are selected. As an example, the physical properties of 55 Duro (A) black soft natural rubber lining having a 0.240 inch thickness that is cured by using the method of the invention at different cure times and temperatures are listed in Table IV below.

TABLE IV

| Cure Temperature, ° F. | 270 | 250 | |
|---|---|---|---|
| Cure Time, hours | 3 | 4 | |
| Thickness, inch | 0.240 | 0.240 | |
| | | | Specification |
| Hardness (A), points | 54 | 54 | 55+/−5 |
| Adhesion strength of rubber-metal, lbf/in | 70.3 | 81.9 | 25 minimum |

It will be understood that the foregoing data are exemplary only. As noted above, those skilled in the art would appreciate that a variety of materials may be used in the rubber body of elastomer assembly 22, and the rubber body may have various thicknesses, depending on the configuration of the damaged portion that is to be repaired.

In general, the cure temperatures may range from approximately 200° F. to approximately 285° F. Curing temperature is dependent on the rubber formulation being used.

Release Film

The release film 38 preferably is made of any suitable material(s). It has been found that the release film may be, for example, nylon, polyolefin, or polymethylpentene monolithic or laminate plastic film material. It is preferred as well that the release film is heat-resistant to 400° F.

Preferably, the release film includes a number of small perforations therethrough in a regular pattern, to allow air and gases to escape from under the heating blanket 44, and to keep the vacuum cover 56 and the heating blanket 44 from adhering to uncured rubber during vulcanization. It would be appreciated by those skilled in the art that the perforations preferably are sufficiently sized and spaced apart from each other to permit the escape of air and gases at a sufficiently rapid rate that the heated air and gases do not build up, or accumulate, thereunder. For example, it has been found that perforations with diameters of approximately 0.015 inch, spaced apart approximately 0.25 inch center to center, are sufficient to permit the heated air and gases to escape.

Those skilled in the art would appreciate that the release film 38 may have any suitable thickness. It has been found that a suitable thickness of the release film may be, for example, approximately 0.001 inch.

Any product with suitable characteristics may be used as the release film. However, it has been found that Airtech A4000RP, manufactured by Airtech International Inc., of Huntington Beach, Calif., U.S.A., may be a suitable release film.

Heating Blanket

The heating blanket 44 preferably includes any suitable material(s). The heating blanket preferably is configured to generate sufficient heat that the rubber is vulcanized, i.e., in any particular application of the invention herein, the temperature achieved preferably is at least that required in accordance with a cure profile associated with a particular rubber body. As would be appreciated by those skilled in the art, various arrangements may be suitable. In one embodiment, the heating blanket 44 preferably includes a body of fabric-reinforced silicone rubber or polymide with embedded resistive elements. A single resistive element "H" is illustrated in FIG. 2A, to represent resistive elements generally. Those skilled in the art would appreciate that, for convenience, the resistive elements preferably require standard service electricity, i.e., 110 or 220V AC in North America.

Preferably, the heating blanket includes one or more resistive elements, positioned to provide substantially uniform heat over the area covered by the heating blanket. The one or more resistive elements in the heating blanket preferably are selected and arranged so that they provide substantially uniform heat over substantially the entire heating blanket.

Any product with suitable characteristics may be used as the heating blanket. For instance, it has been found that flexible silicone rubber heaters, provided by Durex Industries, of Cary, Ill., U.S.A., or polymide blankets made of Kapton™ provided by Dupont, may be suitable.

Controller and Thermocouples

Preferably, the controller 71 is any suitable controller, and it is electrically connected to a source of electrical energy (not shown) and to the heating blanket. The controller controls the cure cycle and the profile of heat application to vulcanize uncured rubber and adhesive system, according to the rubber compound being vulcanized. As described above, it is preferred that an appropriate cure profile is selected for a particular rubber body, based on a number of factors, primarily the rubber formulation that is used.

In one embodiment, the controller may be configured to cause the heating blanket to heat the rubber body in accordance with the cure profile selected therefor based on assumptions about the temperatures achievable based on providing certain amounts of electrical energy. In this embodiment, the controller may be calibrated, for example, to raise the temperature of the heating blanket to approximately a selected temperature based on a certain electrical energy input. However, as this embodiment preferably does not include one or more temperature sensors, it has the disadvantage that the heating is done without the benefit of actual measurement of the temperature, and therefore the temperature actually achieved may be different from that required by the cure profile.

It has been found to be expedient to monitor the temperature of the heating blanket, and to control the electrical energy provided to the heating blanket based on the cure profile and the measured temperature feedback. In one embodiment, the controller 71 preferably is a programmable electronic controller with thermocouple feedback control monitoring. Preferably, and as noted above, the system 20 also includes the temperature sensors "TC". The temperature sensors "TC" preferably are positioned at least partially on the heating blanket, to provide temperature data to the controller 71 as the heating blanket 44 is generating heat. The controller 71 preferably is configured to utilize the temperature data in order to control the electrical energy provided to the heating blanket, so that the heat provided to the rubber body is substantially consistent with the relevant cure profile.

Any suitable device may be used as the temperature sensor "TC". Those skilled in the art would be aware of suitable devices. For instance, in one embodiment, the temperature sensors preferably are thermocouples.

Preferably, a minimum of two thermocouples are used. This is preferred in case one of the thermocouples malfunctions. It is preferred also that the thermocouples are spaced apart so that they are substantially centrally located relative to the rubber body, and also so that they are substantially equidistant from each other, as illustrated in FIG. 2C. Where the area of the heating blanket is relatively large, more than two thermocouples may be used, in order to obtain accurate temperature data.

As can be seen in FIG. 2A, it is also preferred that thermocouples "TC" are positioned on the top surface of the heating blanket. Those skilled in the art would appreciate that any suitable thermocouple or other suitable temperature-sensing device may be used to provide temperature data to the controller 71, substantially on a "real time" basis. For instance, in one embodiment, the thermocouple preferably is a type "J" iron/constanton wire. It is preferred that the thermocouple includes a wire having a diameter of approximately 0.030 inch in diameter. It has been found that a thermocouple wire of approximately 0.030 inch in diameter has sufficient strength but also provides a relatively quick response to temperature changes.

The controller 71 preferably is programmed to provide sufficient electrical energy for the necessary time period, subject to the measured temperature feedback provided by the thermocouples "TC" to enable the heating blanket 44 to generate the heat required to cure the particular rubber body 22 in accordance with its cure profile.

Breather Fabric

The breather fabric 50 preferably is any suitable material(s). The breather fabric is intended to prevent the vacuum cover from sealing itself off against the heating blanket, when the vacuum is applied. It is also preferred that the breather fabric provides one or more channels through which air and gases can be drawn by the vacuum pump.

In one embodiment, the breather fabric 50 preferably includes nylon and polyester material, and is non-woven (i.e., has random fiber placement). The non-woven structure preferably is formed to define a number of cavities or voids therein that are open. Once the vacuum is applied, the breather fabric 50 tends not to be crushed, so that while the vacuum pump is drawing air and gases out, they are able to pass through the breather fabric, and the vacuum cover does not seal itself off, because although the vacuum cover engages the exterior side 54 of the breather fabric 50 when the vacuum is applied, the breather fabric 50 has a sufficiently strong structure that the voids within it remain open. Accordingly, the breather fabric 50 is able to maintain its cavities or voids therein, to prevent the vacuum cover from sealing itself off against the heating blanket. Any entrapped air or volatiles flow through the voids in the fabric during curing, drawn by the vacuum pump. The breather fabric 50 preferably is heat resistant to approximately 400° F.

Vacuum Cover

Preferably, the vacuum cover 56 is made of any suitable material(s). In one embodiment, the bag film includes nylon, polymethylpentene monolithic or laminate plastic film material. It is preferred that nylon film is used.

The vacuum cover preferably is heat resistant to approximately 400° F. with greater than 300 percent elongation. The vacuum cover may be any suitable thickness. It has been found that approximately 0.002 inch is a suitable thickness. It has also been found that Airtech Securlon™, sold by Airtech International Inc., of Huntington Beach, Calif., U.S.A., is suitable for use as a vacuum cover.

Sealing Element

The sealing element 62 preferably is any suitable device or material. In one embodiment, the sealing element 62 preferably is adhesive tape, made of non-curing tape. Any suitable non-curing tape may be used. It has been found that butyl sealant tapes, manufactured by General Sealants, Inc., of City of Industry, California, U.S.A., may be suitable.

As can be seen in FIGS. 1B, 2A, and 2C, the electrical leads 70 connecting the heating blanket 44 to the controller 71 pass through the vacuum cover 56, at a location identified for convenience by reference numeral 74. Preferably, a substantially air-tight seal is provided between the lead 70 and the vacuum cover 56. Such air-tight seal (not shown) may be provided by any suitable materials. For example, parts of the sealing element 62 may be separated and used.

Vacuum Pump

The vacuum pump 69 preferably is any suitable pump or other device. The vacuum pump preferably is capable of "dead heading" and drawing a full atmosphere of vacuum for the whole cure cycle. In one embodiment, the vacuum pump 69 preferably is any one of a diaphragm, rotary vane, piston, or oil/liquid ring vacuum pump 69 for drawing air and gases out of the space defined inside the vacuum cover 56. Any suitable vacuum pump may be used. For instance, a vacuum pump manufactured by GAST Manufacturing Inc., of Benton Harbor, Mich., U.S.A., may be suitable.

As noted above, and as can be seen in FIGS. 1B, 2A, and 2C, the vacuum pump 69 preferably is in fluid communication with the interior space 68 via a tube "T" that engages the vacuum cover 56 via a fitting "F" that is substantially air-tight. It will be understood that one or more parts of the sealing element 62 may also be used to provide a substantially air-tight seal around the fitting "F".

Figure 6:
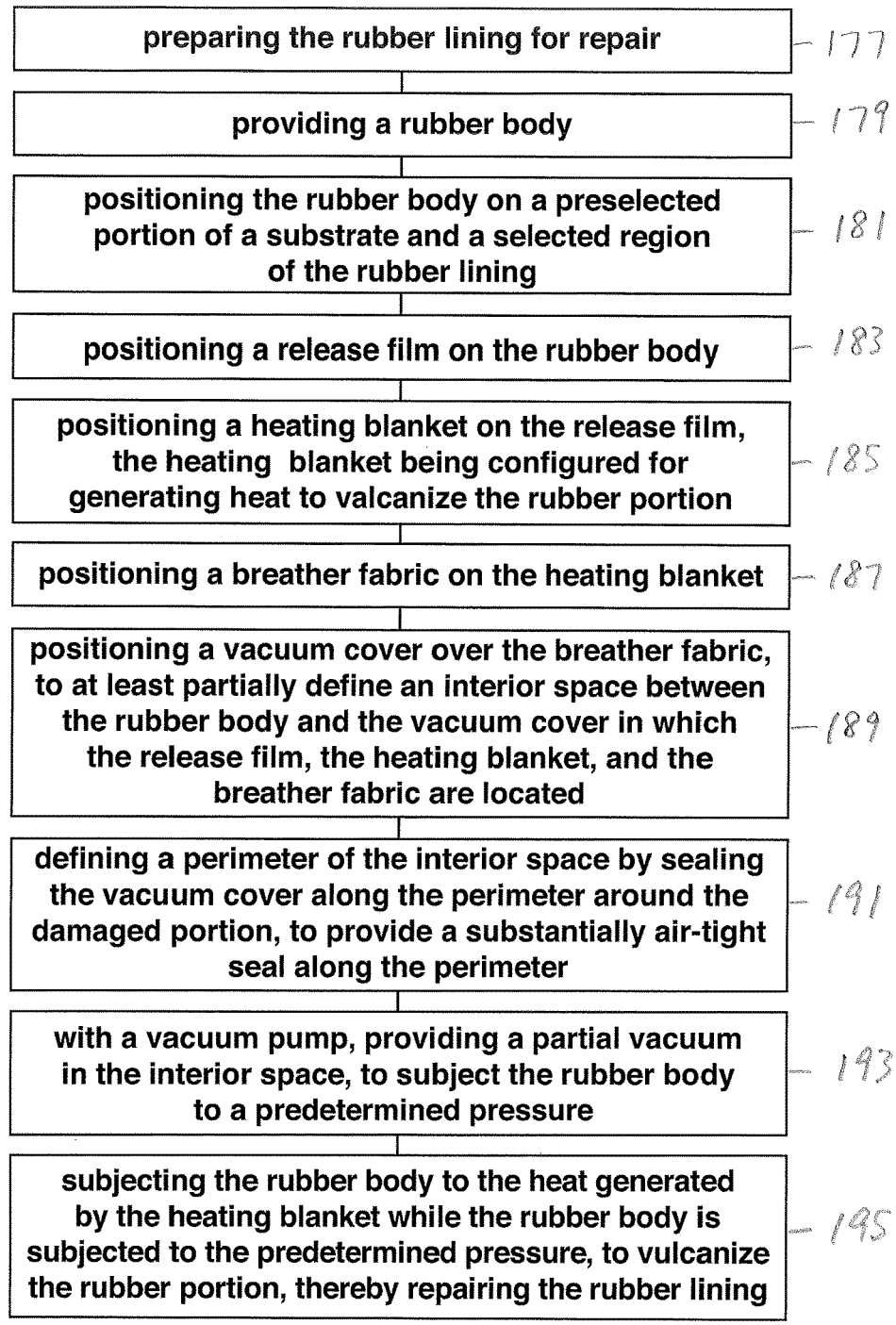
FIG. 6 is a flowchart schematically illustrating an embodiment of a method of the invention.

The invention provides an embodiment of a method of repairing the damaged portion "D" of the rubber lining "L" secured to the substrate "S". As described above, the damaged portion "D" is at least partially adjacent to the undamaged portion "U" of the rubber lining "L" (FIG. 1B). In one embodiment, the method 175 (schematically illustrated in FIG. 6) preferably includes the step of, first, preparing the rubber lining "L" for repair (FIG. 6, step 177). As described above, and as will be described further below, it is preferred that the damaged portion "D" is removed, to expose the preselected portion 28 of the surface 30 of the substrate "S". Preferably, the preselected portion 28 is prepared so that, upon vulcanization, the rubber portion will bond to it. In addition, it is also preferred that the rubber body 22 overlaps onto the selected region 39 of the undamaged portion "U" of the pre-existing rubber lining "L". Preferably, the selected region 39 is also prepared so that the rubber portion 24 bonds securely to it upon vulcanization. The rubber body 22 is provided, and as described above, the rubber body 22 includes the rubber portion configured to bond with the preselected portion 28 of the substrate and the selected region 39 of the undamaged portion of the rubber lining upon vulcanization of the rubber portion (step 179). The rubber body 22 preferably is positioned on the preselected portion 28 of the substrate "S" and the selected region 39 of the undamaged portion "U" of the lining "L" (step 181). The release film 38 is positioned on the rubber body 22 (step 183). The heating blanket 44 is then positioned on the release film 38, the heating blanket 44 being configured for generating heat to vulcanize the rubber portion 22 (step 185). Next, the breather fabric 50 is positioned on the heating blanket 44 (step 187). The vacuum cover 56 is positioned over the breather fabric 50, to at least partially define the interior space 68 between the rubber body 22 and the vacuum cover 56 in which the release film 38, the heating blanket 44, and the breather fabric 50 are located (step 189). The perimeter 64 of the interior space 68 is at least partially defined by sealing the vacuum cover 56 along the perimeter 64 around the selected region and the preselected portion, to provide a substantially air-tight seal along the perimeter 64 (step 191). With the vacuum pump 69, the partial vacuum is provided in the interior space 68, to subject the rubber body 22 to the predetermined pressure (step 193). The rubber body 22 is subjected to the heat generated by the heating blanket 44 while the rubber body 22 is also subjected to the predetermined pressure, to vulcanize the rubber portion 24, thereby repairing the rubber lining "L" (step 195).

As will be described, it is preferred that the substrate "S" is also prepared for the repair of the rubber lining.

It will be appreciated by those skilled in the art that the order in which the steps of the methods of the invention are schematically illustrated or described is not necessarily the order in which they are performed. For instance, although step 193 is shown as preceding step 195, it will be understood that the rubber body 22 preferably is subjected to the predetermined pressure (i.e., due to the operation of the vacuum pump 69, to cause the rubber body 22 to be subjected to approximately atmospheric pressure, due to the flexibility of the vacuum cover 56) and to the heat generated by the heating blanket 44 at substantially the same time.

Preferably, the vacuum pump 69 operates while the rubber body 22 is subjected to the heat generated by the heating blanket 44 and to the predetermined pressure, to remove gases released from the rubber body 22 during vulcanization thereof from the interior space 68. As described above, it is preferred that the heat is generated in accordance with the preselected cure profile for the rubber body 22. This is effected via control of the electrical energy supplied to the heating blanket, by the controller 71.

In one embodiment, after step 185 set out above, the method preferably also includes positioning the temperature sensor at least partially on the heating blanket, to provide temperature data regarding the heating blanket. Also, it is preferred that the controller is electrically connected to the heating blanket, to control electrical energy provided to the heating blanket. As described above, preferably, the controller is configured for controlling the electrical energy based on a preselected cure profile for the rubber body and the temperature data, to subject the rubber body to temperatures substantially in accordance with the cure profile. The temperature data is transmitted from the temperature sensor to the controller. Finally, the controller is used to control the electrical energy provided to the heating blanket, based on the cure profile and the temperature data.

As is also described above, it is preferred that the predetermined pressure is approximately ambient atmospheric pressure.

It is preferred that the damaged area is prepared for repair as follows.

(a) The damaged rubber lining is removed. Preferably, all rubber in the damaged area is removed, to the metal substrate. This is preferred because, first, it is likely that all the rubber in the area, to the metal substrate, is at least partially damaged or weakened, regardless of its appearance.

Second, the commodity carried in the vessel may have penetrated through the damaged rubber to the metal substrate, and damaged the substrate. For instance, there may be corrosion of the metal substrate that is not visible until all the rubber in the damaged area has been removed. For example, there may be oxidation of the metal substrate, or there may be a corrosion film on the metal substrate. Those skilled in the art would appreciate that these are required to be substantially removed so that the rubber portion will adhere securely to the substrate.

The lateral extent of the damaged area is limited by those parts of the existing lining where the existing lining has good adhesion to the metal substrate.

(b) The exposed metal substrate is buffed to remove corrosion until it is clean and bright. Any suitable tool may be used. For example, a grinder, a sander, or an abrasive wheel may be used.

(c) The exposed edge of the existing rubber lining (i.e., the undamaged portion) is also buffed. This is done to roughen the existing rubber, to facilitate adhesion of the patch to the selected region of the undamaged portion "U" of the pre-existing rubber lining.

(d) The original surface of the existing rubber lining (i.e., the undamaged portion) is buffed to approximately 4 inches from the cut edge. This is to roughen the surface of the existing rubber lining in an area around the area that is to be repaired, so that the part of the rubber patch that overlaps onto the existing rubber lining may bond well and become secured to the existing rubber lining. (It will be understood that the "original surface" of the undamaged portion "U" and the exposed edge referred to above comprise the selected region 39.)

(e) The buffed surfaces of the metal and the rubber are cleaned, as is known in the art.

(f) Adhesives or cements are applied on the buffed surfaces of the metal and rubber lining. The adhesives or cements preferably are part of a three-part adhesive system, such as are known in the art.

(g) A piece of uncured rubber patch (i.e., to provide the rubber body) is cut, and the patch is centered with tack and allowed to dry.

(h) The patch is positioned on the repair area.

(i) In accordance with known processes, the patch is rolled and stitched down.

Following vulcanization of the rubber portion, the other elements of the system preferably are removed. First, the sealing element 62 is released to permit removal of the vacuum cover 56 from engagement to the undamaged portion "U" along the perimeter 64. Next, the vacuum cover 56 is removed from engagement with the breather fabric 50, and the breather fabric 50 is removed from engagement with the heating blanket 44. The heating blanket 44 is then removed from engagement with the release film 38, and the release film 38 is removed from engagement with the vulcanized rubber portion 24.

From the foregoing description, it can be seen that the heating blanket preferably is generally flat, or may have simple contours, where the surface of the area that is to be repaired, or provided with a rubber lining, is generally flat, or has a simple contour. However, and as can be seen in FIGS. 3A-4C, where the shapes of the workpieces to be lined with rubber are relatively complex, the heating blanket 244 is specifically designed to fit the geometry of the workpiece.

Figure 3A:
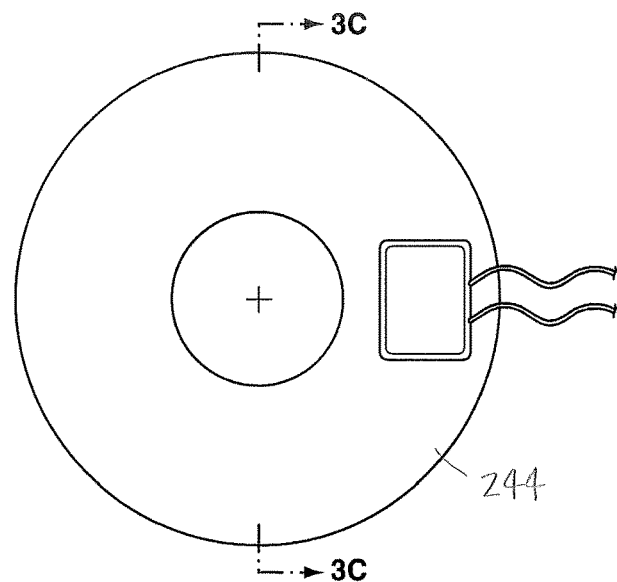
FIG. 3A is a top view of an alternative embodiment of a heating blanket of the invention formed to vulcanize rubber on a workpiece, drawn at a larger scale.
Figure 3B:
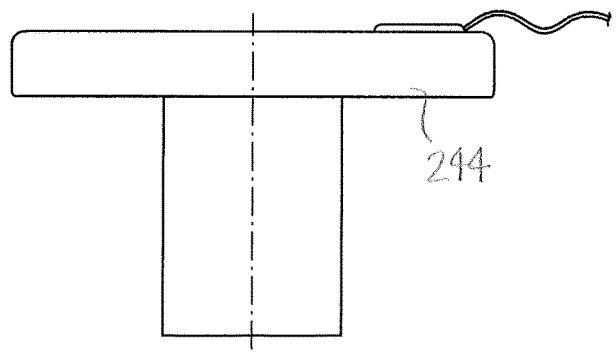
FIG. 3B is a side view of the heating blanket of FIG. 3A.
Figure 3C:
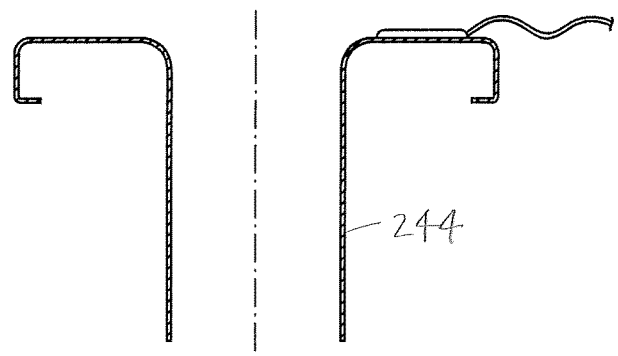
FIG. 3C is a cross-section of the heating blanket of FIGS. 3A and 3B.
Figure 4A:
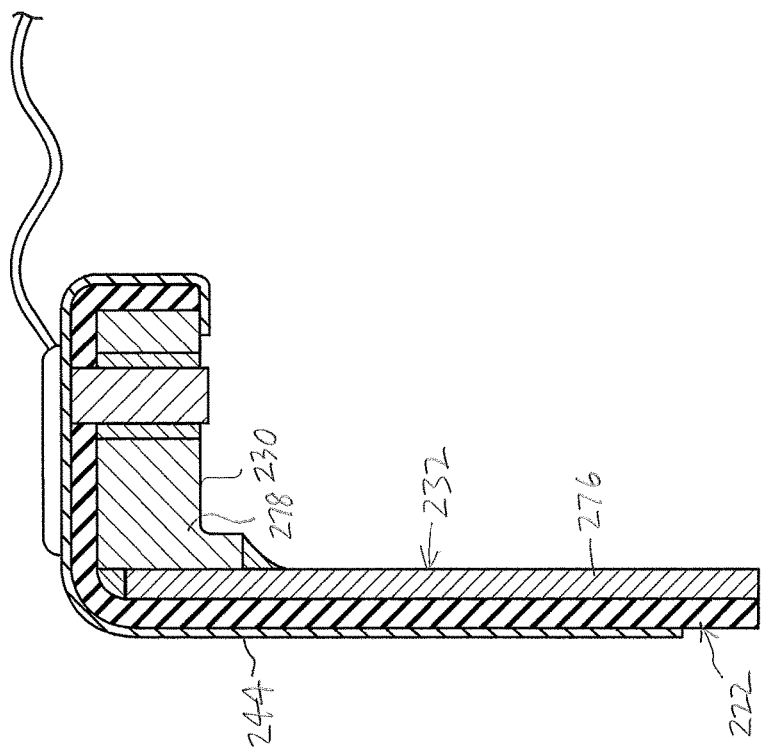
FIG. 4A is a cross-section of the heating blanket of FIGS. 3A-3C in position on a rubber body on the workpiece, drawn at a larger scale.
Figure 4A:
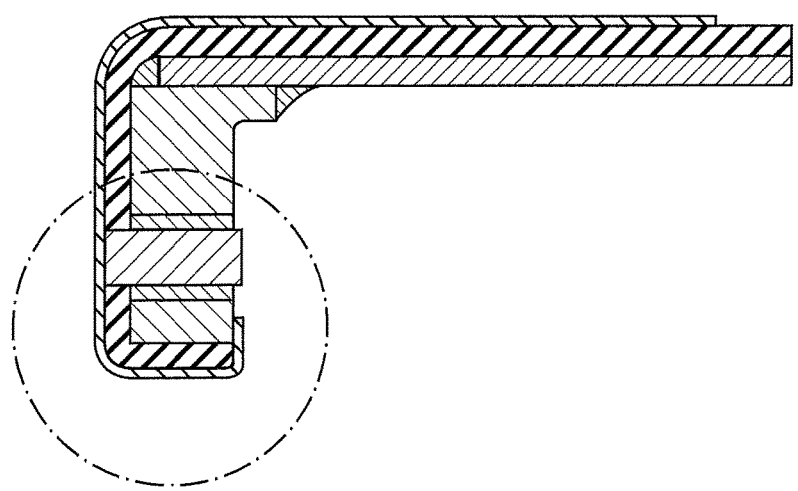
Figure 4B:
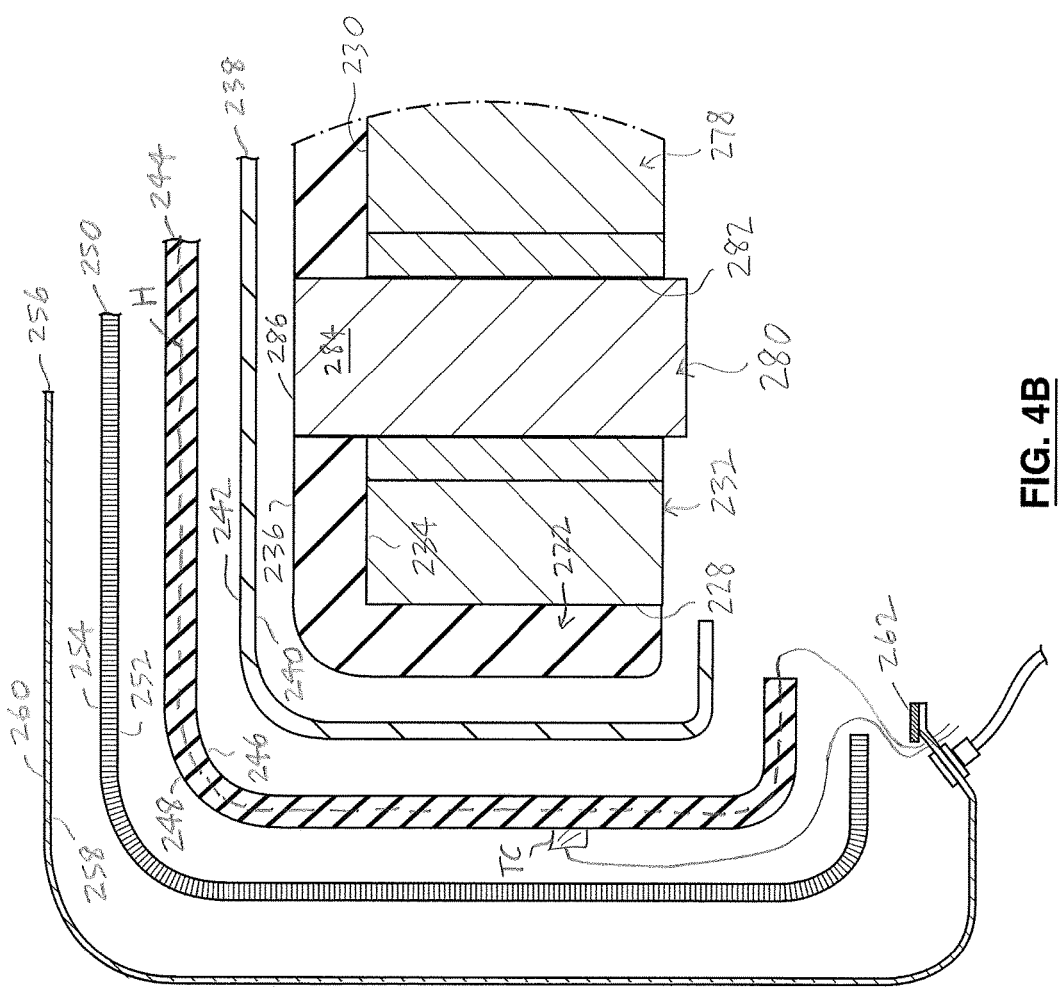
FIG. 4B is a partial exploded view of a portion of another embodiment of the system of the invention on the workpiece of FIG. 4A, drawn at a larger scale.
Figure 4C:
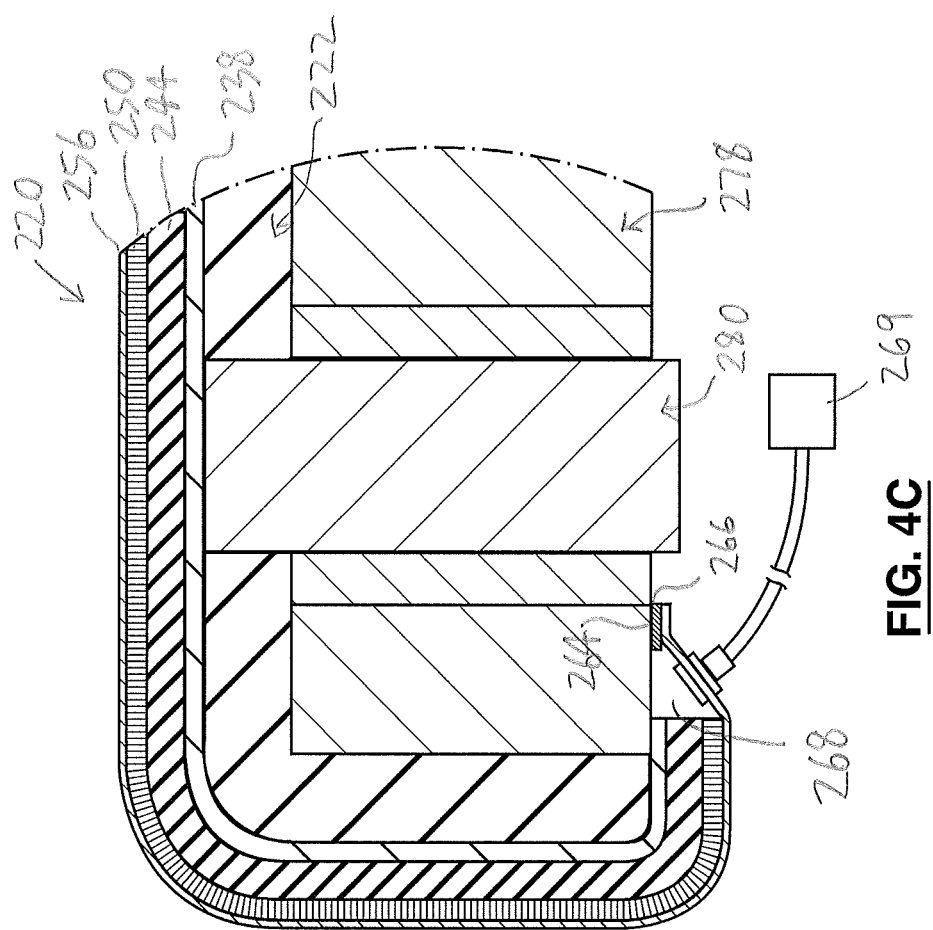
FIG. 4C is a cross-section of the portion of the system of FIG. 4B on the portion of the workpiece of FIG. 4B.

Another embodiment of a system 220 of the invention is disclosed in FIGS. 3A-4C. As will be described, the system 220 is for vulcanizing certain parts (e.g., flanges or manways on tanks or railcars) that are difficult to cover adequately, for vulcanization thereof with steam. In one embodiment, the system 220 preferably includes one or more rubber bodies 222, each including a rubber portion (not shown in FIGS. 3A-4C). As will be described, the rubber body 222 preferably is positionable on one or more preselected portions 228 (FIG. 4B) of a surface 230 of a workpiece 232. It is also preferred that the rubber body 222 includes an inner side 234 engageable with the preselected portion 228 and an outer side 236 opposed to the inner side 234. As can be seen in FIG. 4B, the system 220 preferably includes a release film 238 having a first side 240 and an opposed second side 242, the first side 240 being engageable with the outer side 236 of the rubber body 222. The system 220 preferably also includes a heating blanket 244 for generating heat to vulcanize the rubber portion, the heating blanket 244 having a contact side 246 and an opposed non-contact side 248, the contact side 246 being engageable with the second side 242 of the release film 238. It is also preferred that the system 220 includes a breather fabric 250 having an interior side 252 and an opposed exterior side 254, the interior side 252 being engageable with the non-contact side 248 of the heating blanket 244. Preferably, the breather fabric 250 is also configured to permit gases generated upon the vulcanization of the rubber portion to be released therethrough. In one embodiment, the system 220 preferably also includes a vacuum cover 256 having an inward side 258 and an opposed outward side 260, the inward side 258 being engageable with the exterior side 254 of the breather fabric 250. As can be seen in FIG. 4B, the system 220 preferably also includes one or more sealing elements 262 for sealing the vacuum cover 256 along a perimeter 264 (FIG. 4C) surrounding the preselected portion 228 to provide a substantially air-tight seal 266 along the perimeter 264. Preferably, the perimeter 264 at least partially defines an interior space 268 extending between the inward side 258 of the vacuum cover 256 and the outer side 236 of the rubber body 222, and the release film 238, the heating blanket 244, and the breather fabric 250 being located in the interior space 268 (FIG. 4C). The system 220 preferably also includes a vacuum pump 269 (FIG. 4C) in fluid communication with the interior space 268 for providing at least a partial vacuum in the interior space 268, to subject the rubber body 222 to approximately atmospheric pressure. The rubber body 222 preferably is vulcanizable by the heat generated by the heating blanket 244 and upon being subjected to approximately atmospheric pressure, as will also be described.

As described above, it is also preferred that the heating blanket includes one or more resistive heating elements that generate heat when electrical energy is provided thereto. Preferably, the system includes a controller for controlling the electrical energy provided to the heating blanket. It is also preferred that the controller is configured to control the electrical energy provided to the heating blanket substantially in accordance with the preselected cure profile for the rubber body. The system 220 preferably additionally includes at least one temperature sensor at least partially positioned on the heating blanket, for obtaining temperature data for transmission to the controller, so that the controller controls the electrical energy provided to the heating blanket based on the preselected cure profile and the temperature data.

For example, the workpiece 232 illustrated in FIGS. 4A-4C has a shaft or pipe 276 and a flange 278 secured to the shaft 276 that is generally orthogonal to the shaft 276 (FIG. 4A). Only the workpiece 232, the rubber body 222, and the heating blanket 244 are illustrated in FIG. 4A, for clarity of illustration. Those skilled in the art would appreciate that the heating blanket 244 may be made of any suitable materials. In one embodiment, the heating blanket 244 preferably is made of molded silicone, i.e., the body of the heating blanket 244 preferably is shaped to fit onto the preselected portion of the workpiece's surface, to which the rubber lining is to be bonded. The heating blanket 244 alone is illustrated in FIGS. 3A-3C, for clarity of illustration. As can be seen in FIGS. 4A and 4B, not all of the surface 230 of the workpiece 232 is to be covered with rubber.

As shown in FIGS. 4A-4C, the flange 278 illustrated is a typical flange. Spacers 280 may be positioned in apertures 282 in the flange 278, as will be described below.

Figure 7:
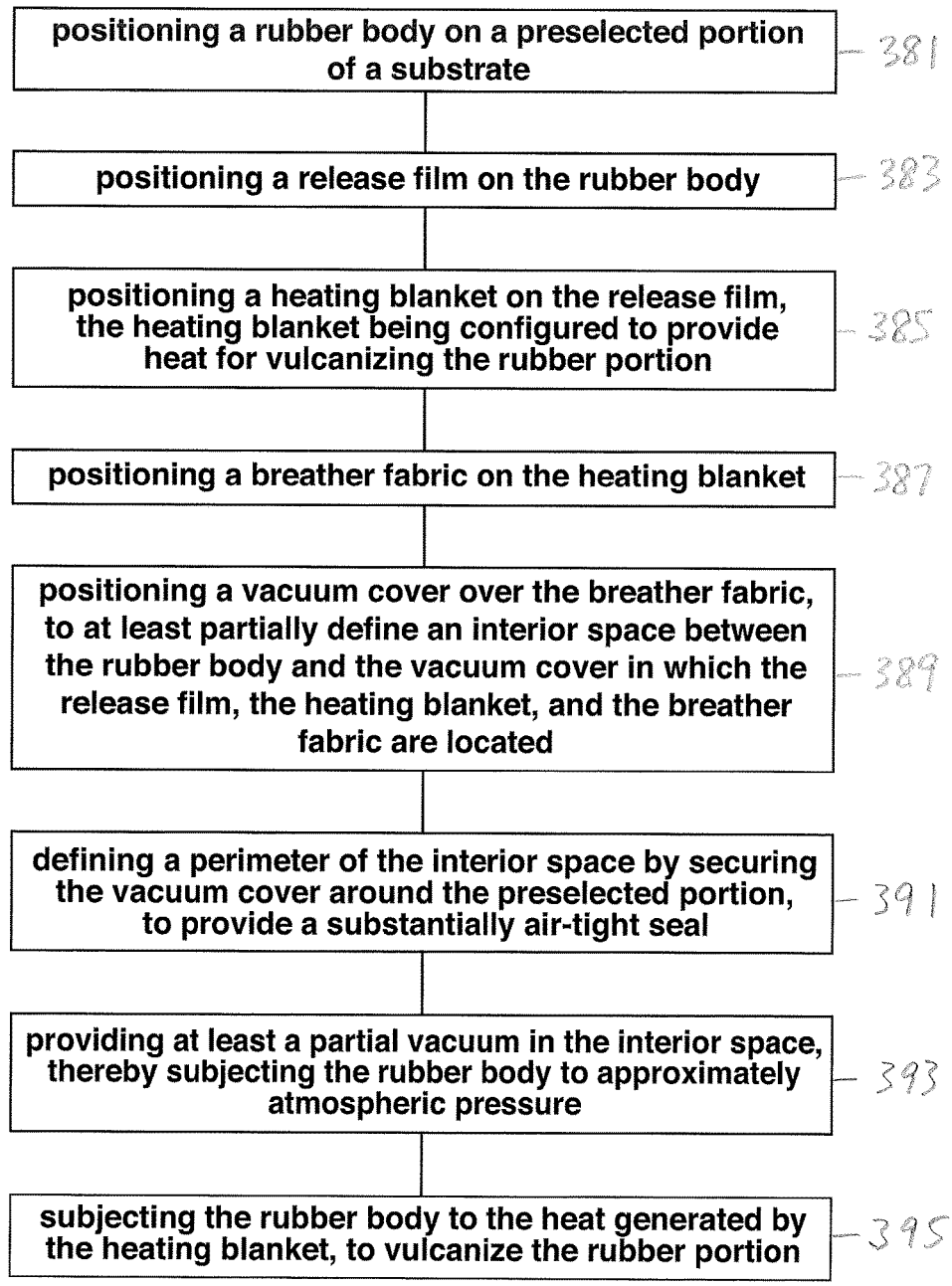
FIG. 7 is a flowchart schematically illustrating another embodiment of a method of the invention.

In one embodiment, a method 375 for vulcanizing the rubber portion of the rubber body 222 to one or more preselected portions 228 of the surface 230 of the workpiece 232 preferably includes, first, positioning the rubber body 222 on the preselected portion 228 (FIG. 7, step 381). The release film 238 is positioned on the rubber body 222 (step 383). Next, a heating blanket 244 is positioned on the release film 238, the heating blanket 244 being configured to provide heat for vulcanizing the rubber portion (step 385). The breather fabric 250 is then positioned on the heating blanket 244 (step 387). Next, the vacuum cover 256 is positioned over the breather fabric 250, to at least partially define the interior space 268 between the rubber body 222 and the vacuum cover 256 in which the release film 238, the heating blanket 244, and the breather fabric 250 are located (step 389). The perimeter 264 of the interior space 268 is at least partially defined by securing the vacuum cover 256 around the preselected portion 228, to provide the substantially air-tight seal 266 (step 391). At least a partial vacuum is provided in the interior space 268, thereby subjecting the rubber body 222 to approximately atmospheric pressure (step 393). The rubber body 222 is subjected to the heat generated by the heating blanket 244, to vulcanize the rubber body 222 (step 395). It is understood that the rubber body is subjected to such heat while it is also subjected to approximately atmospheric pressure.

Preferably, the heat is generated by the heating blanket upon electrical energy being supplied to the heating blanket, the electrical energy being controlled to cause the heating blanket to generate the heat in accordance with a preselected cure profile for the rubber body.

In one embodiment, after the heating blanket is in position, the temperature sensor preferably is positioned at least partially on the heating blanket, to provide temperature data regarding the heating blanket. The controller preferably is electrically connected to the heating blanket, to control electrical energy provided to the heating blanket, the controller being configured for controlling the electrical energy based on a selected cure profile for the rubber body and the temperature data, to subject the rubber body to temperatures substantially in accordance with the cure profile. The temperature data is transmitted from the temperature sensor to the controller. The controller is used to control the electrical energy provided to the heating blanket, based on the cure profile and the temperature data.

As can be seen in FIG. 4B, in one embodiment, the spacer 280 preferably is positioned in the aperture 282 so that a portion 284 thereof extends past the flange 278. The spacer 280 preferably is positioned so that an end surface 286 of the spacer 280 is substantially flush with the outer side 236 of the rubber body 222. Those skilled in the art would appreciate that, because the end surface 286 is positioned substantially flush or level with the outer side 236, the release film 238 is positionable over the end surface 286 as well as over the outer side 236 of the rubber body 222, to lie substantially flat over the end surface 286 and the part of the outer side 236 adjacent to the end surface 286. This permits the other elements (i.e., the heating blanket 244, the breather fabric 250, and the vacuum cover 256) in the region of the spacer 280 to lie substantially flat, for optimum performance.

It will be understood that, after the rubber portion has been cured (i.e., vulcanized), and after the elements including the release film 238 have been removed, the spacer 280 preferably is removed, to open the aperture 282. Those skilled in the art would appreciate that the spacer 280 is intended to generally prevent the rubber from the rubber body from entering the aperture 282, to permit another element (e.g., a bolt) to be inserted into the aperture 282. For instance, once the spacer 282 has been removed, other elements (e.g., a bolt (not shown)) may be positioned in the aperture 282.

Those skilled in the art would appreciate that, once the rubber portion has been vulcanized, certain elements of the system 220 preferably are removed, to leave the vulcanized rubber portion on the workpiece. The vacuum cover 256 is released from engagement to the surface along the perimeter. The sealing element may be removed at this time. The vacuum cover 256 is then removed from engagement with the breather fabric 250. The breather fabric 250 is removed from engagement with the heating blanket 244. The heating blanket 244 is removed from engagement with the release film 238. The release film 238 is removed from engagement with the rubber body 222. As noted above, the spacer 280 preferably is also removed after vulcanization, to open the aperture 282.

Those skilled in the art would appreciate that, in some applications, it may be necessary or desirable to vulcanize rubber to a wall 488 of an aperture in which a spacer 480 is positioned. An embodiment of a system 420 with which this can be accomplished is illustrated, in part, in FIGS. 5A and 5B.

Figure 5A:
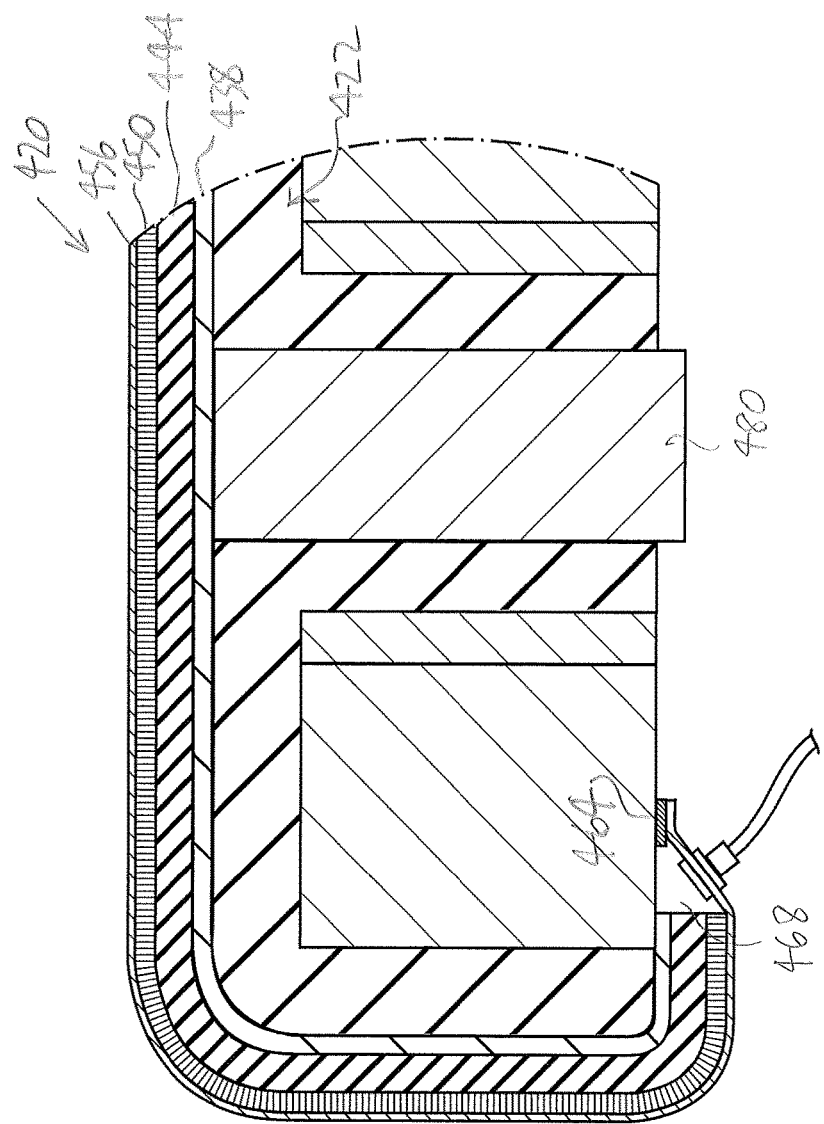
FIG. 5A is a cross-section of a portion of another alternative embodiment of the system of the invention on a part of a workpiece.
Figure 5B:
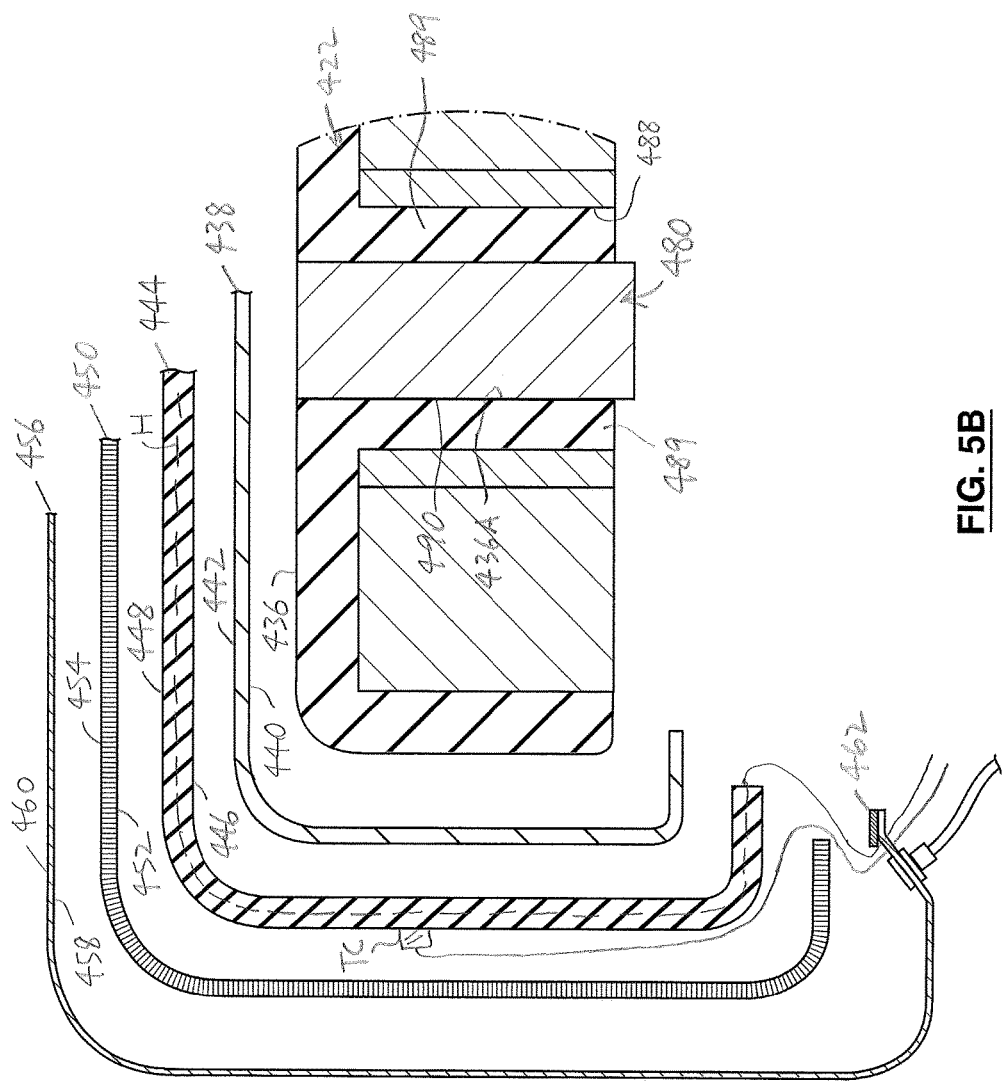
FIG. 5B is a partial exploded view of a portion of the system of FIG. 5A.

As can be seen in FIG. 5A, in one embodiment, the system 420 preferably includes one or more rubber bodies 422, each including a rubber portion (not shown in FIGS. 5A and 5B). Preferably, the rubber body 422 is positionable on one or more preselected portions 428 of a surface 430 of a workpiece 432. However, as noted above, in the embodiment illustrated in FIGS. 5A and 5B, the preselected portions 428 preferably include the walls 488 of the aperture. The rubber body 422 has an inner side 434 for engagement with the preselected portion 428.

As can be seen in FIGS. 5A and 5B, it is preferred that a spacer 480 is positioned in the aperture prior to vulcanization (i.e., as well as a part 489 of the rubber body 422 that is positioned in the aperture with the spacer 480), so that one or more sides 490 of the spacer 480 engage an outer side 436A of the rubber body 422 that is positioned in the aperture. As can also be seen in FIGS. 5A and 5B, the spacer 480 preferably includes an end surface 486 that, prior to vulcanization, is positioned substantially flush with an outer surface 436.

It is also preferred that a release film 438 is positioned on the outer side 436 of the rubber body 422, except for the outer side 436A, which is engaged with the side 490 of the spacer 480. Also, the release film 438 preferably is positioned on the end surface 486. The release film 438 includes a first side 440 engageable with the outer side 436 of the rubber body 422, and an opposed second side 442.

As can also be seen in FIG. 5A and 5B, a heating blanket 444 preferably is positioned on the release film 438. The heating blanket 444 includes a contact side 446 for engagement with the second side 442 of the release film 436. The heating blanket 444 also includes a non-contact side 448 opposed to the contact side 446. It is preferred that a breather fabric 450 is positioned on the heating blanket 444, and that a vacuum cover 456 is positioned over the breather fabric 450. As can be seen in FIG. 5B, the breather fabric 450 preferably includes an interior side 452 engageable with the non-contact side 448 of the heating blanket 444, and an opposed exterior side 454. Preferably, the vacuum cover 456 includes an inward side 458 positionable to face the breather fabric 450, and an opposed outward side 460. In the same manner as described above, the vacuum cover 456 preferably is secured by a sealing element 462 around a perimeter 464.

It is also preferred that a vacuum pump (not shown in FIGS. 5A and 5B) is used to draw substantially all of the air out of an interior space 468. The interior space 468 is at least partially defined by the perimeter 464, and also by the inward side 458 of the vacuum cover 456 and the outer side 436 of the rubber body 422. As can be seen in FIGS. 5A and 5B, the release film 438, the heating blanket 444, and the breather fabric 450 are positioned in the interior space 468. As a result, the rubber body 422 is subjected to approximately atmospheric pressure. Substantially simultaneously, the rubber body 422 is subjected to heat generated by the heating blanket 444, to vulcanize the rubber portion thereof.

After the rubber portion is vulcanized, the vacuum cover, the breather fabric, the heating blanket and the release film are removed, and the spacer 480 is then removed. When the spacer 480 is removed, the aperture, as lined with a part of the vulcanized rubber portion, is then exposed. The spacer 480 is intended to hold the part of the rubber body that is in the aperture in a desired position so that, after the spacer 480 is removed, the lined aperture may receive one or more preselected elements, e.g., a bolt.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of repairing a damaged portion of a rubber lining secured to a surface of a vessel body, the damaged portion being at least partially adjacent to an undamaged portion of the rubber lining and to at least one preselected portion of the surface of the vessel body, the method comprising the steps of:
    (a) preparing a selected region of the undamaged portion of the rubber lining, and said at least one preselected portion, for repair;
    (b) providing a rubber body comprising a rubber portion configured to bond with said at least one preselected portion of the surface of the vessel body and the selected region of the undamaged portion of the rubber lining upon vulcanization of the rubber portion;
    (c) positioning the rubber body on the preselected portion and on the selected region;
    (d) positioning a release film on the rubber body;
    (e) positioning a heating blanket on the release film, the heating blanket being configured for generating heat to vulcanize the rubber portion;
    (f) positioning a breather fabric on the heating blanket;
    (g) positioning a vacuum cover over the breather fabric, to at least partially define an interior space between the rubber body and the vacuum cover in which the release film, the heating blanket, and the breather fabric are located;
    (h) at least partially defining a perimeter of the interior space by sealing the vacuum cover along the perimeter around the selected region and the preselected portion, to provide a substantially air-tight seal along the perimeter;
    (i) with a vacuum pump, providing a partial vacuum in the interior space, to subject the rubber body to a predetermined pressure that is approximately atmospheric pressure; and
    (j) subjecting the rubber body to the heat generated by the heating blanket while the rubber body is subjected to the predetermined pressure, to vulcanize the rubber portion, to bond the rubber body to said at least one preselected portion of the surface of the vessel body and to said at least one selected region of the undamaged portion of the rubber lining.

2. A method according to claim 1 in which the vacuum pump operates while the rubber body is subjected to the heat generated by the heating blanket and to the predetermined pressure, to remove gases released from the rubber body during vulcanization thereof from the interior space.

3. A method according to claim 1 in which, in step (j) thereof, the heat is generated in accordance with a preselected cure profile for the rubber body.

4. A method according to claim 3 in which, in step (j) thereof, the heat is generated by the heating blanket upon electrical energy being supplied to the heating blanket, the electrical energy being controlled to cause the heating blanket to generate the heat in accordance with the preselected cure profile.

5. A method according to claim 1 additionally comprising, after step (e):
    (e.1) positioning at least one temperature sensor at least partially on the heating blanket, to provide temperature data regarding the heating blanket;
    (e.2) electrically connecting a controller to the heating blanket, to control electrical energy provided to the heating blanket, the controller being configured for controlling the electrical energy based on a preselected cure profile for the rubber body and the temperature data, to subject the rubber body to temperatures substantially in accordance with the preselected cure profile;
    (e.3) transmitting the temperature data from said at least one temperature sensor to the controller; and
    (e.4) using the controller to control the electrical energy provided to the heating blanket, based on the cure profile and the temperature data.

6. A method according to claim 1 in which the predetermined pressure is approximately ambient atmospheric pressure.

7. A method according to claim 1 additionally comprising the steps of:
    (k) following vulcanization of the rubber portion, releasing said at least one sealing element, to permit removal of the vacuum cover from engagement to the undamaged portion along the perimeter;
    (l) removing the vacuum cover from engagement with the breather fabric;
    (m) removing the breather fabric from engagement with the heating blanket;
    (n) removing the heating blanket from engagement with the release film; and
    (o) removing the release film from engagement with the vulcanized rubber portion.

8. A method for vulcanizing a rubber portion of at least one rubber body to at least one preselected portion of a surface of a vessel body and at least one selected region of an undamaged portion of a pre-existing rubber lining bonded to the surface, the method comprising the steps of:
    (a) positioning said at least one rubber body on said at least one preselected portion and on said at least one selected region;
    (b) positioning a release film on said at least one rubber body;
    (c) positioning a heating blanket on the release film, the heating blanket being configured to provide heat for vulcanizing the rubber portion;
    (d) positioning a breather fabric on the heating blanket;
    (e) positioning a vacuum cover over the breather fabric, to at least partially define an interior space between said at least one rubber body and the vacuum cover in which the release film, the heating blanket, and the breather fabric are located;

(f) at least partially defining a perimeter of the interior space by securing the vacuum cover around said at least one preselected portion, to provide a substantially air-tight seal;

(g) providing at least a partial vacuum in the interior space, thereby subjecting said at least one rubber body to approximately atmospheric pressure; and (h) subjecting said at least one rubber body to the heat generated by the heating blanket, to vulcanize the rubber portion, to bond said at least one rubber body to said at least one preselected portion of the surface of the vessel body and to said at least one selected region of the undamaged portion of the pre-existing rubber lining.

9. A method according to claim 8 in which, in step (h) thereof, the heat is generated by the heating blanket upon electrical energy being supplied to the heating blanket, the electrical energy being controlled to cause the heating blanket to generate the heat in accordance with a preselected cure profile for said at least one rubber body.

10. A method according to claim 8 additionally comprising, after step (c):

(c.1) positioning at least one temperature sensor at least partially on the heating blanket, to provide temperature data regarding the heating blanket;

(c.2) electrically connecting a controller to the heating blanket, to control electrical energy provided to the heating blanket, the controller being configured for controlling the electrical energy based on a selected cure profile for said at least one rubber body and the temperature data, to subject said at least one rubber body to temperatures substantially in accordance with the cure profile;

(c.3) transmitting the temperature data from said at least one temperature sensor to the controller; and (c.4) using the controller to control the electrical energy provided to the heating blanket, based on the cure profile and the temperature data.

11. A method according to claim 8 additionally comprising the steps of:

(i) releasing the vacuum cover from engagement to the surface along the perimeter;

(j) removing the vacuum cover from engagement with the breather fabric;

(k) removing the breather fabric from engagement with the heating blanket;

(l) removing the heating blanket from engagement with the release film; and (m) removing the release film from engagement with the vulcanized rubber portion.

12. A method for vulcanizing a rubber portion of at least one rubber body to at least one preselected portion of a surface of a workpiece, the workpiece comprising at least one flange comprising at least one aperture therein, and at least one spacer positionable in said at least one aperture to locate a portion of said at least one spacer having an end surface thereof and projecting beyond said at least one flange, the method comprising the steps of:

(a) positioning said at least one spacer in said at least one aperture;

(b) positioning said at least one rubber body on said at least one preselected portion, said at least one rubber body comprising an inner side engaged with said at least one preselected portion and an outer side opposite to the inner side and the end surface of the spacer being located flush with the outer side;

(c) positioning a release film on the outer side of said at least one rubber body;

(d) positioning a heating blanket on the release film, the heating blanket being configured to provide heat for vulcanizing the rubber portion;

(e) positioning a breather fabric on the heating blanket;

(f) positioning a vacuum cover over the breather fabric, to at least partially define an interior space between said at least one rubber body and the vacuum cover in which the release film, the heating blanket, and the breather fabric are located;

(g) at least partially defining a perimeter of the interior space by securing the vacuum cover around said at least one preselected portion, to provide a substantially air-tight seal;

(h) providing at least a partial vacuum in the interior space, to subject said at least one rubber body to approximately atmospheric pressure;

(i) subjecting said at least one rubber body to the heat generated by the heating blanket, to vulcanize the rubber portion, to bond said at least one rubber body to said at least one preselected portion of the surface of the workpiece; and (j) removing said at least one spacer from said at least one aperture.

13. A method for vulcanizing a rubber portion of at least one rubber body to at least one preselected portion of a surface of a workpiece, the workpiece comprising at least one flange comprising at least one aperture therein, and at least one spacer positionable in said at least one aperture to locate a portion of said at least one spacer having an end surface thereof and projecting beyond said at least one flange, the method comprising the steps of:

(a) positioning said at least one spacer in said at least one aperture defined by at least one wall thereof;

(b) positioning said at least one rubber body on said at least one preselected portion, said at least one rubber body comprising an inner side engaged with said at least one preselected portion and an outer side opposite to the inner side and the end surface of the spacer being located flush with the outer side, and locating a part of said at least one rubber body in said at least one aperture, between said at least one spacer and said at least one wall of said at least one aperture;

(c) positioning a release film on the outer side of the outer side of said at least one rubber body;

(d) positioning a heating blanket on the release film, the heating blanket being configured to provide heat for vulcanizing the rubber portion;

(e) positioning a breather fabric on the heating blanket;

(f) positioning a vacuum cover over the breather fabric, to at least partially define an interior space between said at least one rubber body and the vacuum cover in which the release film, the heating blanket, and the breather fabric are located;

(g) at least partially defining a perimeter of the interior space by securing the vacuum cover around said at least one preselected portion, to provide a substantially air-tight seal;

(h) providing at least a partial vacuum in the interior space, to subject said at least one rubber body to approximately atmospheric pressure;

(i) subjecting said at least one rubber body to the heat generated by the heating blanket, to vulcanize the rubber portion, to bond said at least one rubber body to said at least one preselected portion of the surface of the workpiece and to bond the part of said at least one rubber body to said at least one wall of said at least one aperture; and (j) removing said at least one spacer from said at least one aperture.

* * * * *